United States Patent [19]
Smith, Jr.

[11] 3,897,868
[45] Aug. 5, 1975

[54] CONSTANT RATE FEEDER

[75] Inventor: Horace L. Smith, Jr., Richmond, Va.

[73] Assignee: Smitherm Industries, Inc., Richmond, Va.

[22] Filed: July 1, 1974

[21] Appl. No.: 485,008

[52] U.S. Cl. .................. 198/37; 177/185; 198/39; 222/55
[51] Int. Cl.² ........................................ B65G 43/08
[58] Field of Search ................ 198/37, 39; 222/55; 177/185, DIG. 5

[56] References Cited
UNITED STATES PATENTS

| | | | |
|---|---|---|---|
| 2,793,026 | 5/1957 | Giardino et al. | 177/185 |
| 3,087,652 | 4/1963 | Smith | 222/55 |
| 3,162,325 | 12/1964 | Hall et al. | 222/55 |

*Primary Examiner*—Evon C. Blunk
*Assistant Examiner*—Douglas D. Watts
*Attorney, Agent, or Firm*—Strauch, Nolan, Neale, Nies & Kurz

[57] ABSTRACT

A constant rate feeder for bulk materials which includes a vertically displaceable, constant speed conveyor; a feeder for supplying material to the conveyor; a system for detecting vertical movements of the conveyor resulting from changes in the amount of material carried thereby and for adjusting the rate at which material is supplied to the conveyor accordingly; and a system for magnetically damping the movements of the conveyor.

10 Claims, 4 Drawing Figures

3,897,868

CONSTANT RATE FEEDER

This invention relates to handling equipment for bulk materials and, more particularly, to feeders for delivering such materials to a designated location at a constant delivery rate.

My U.S. Pat. No. 3,087,652 discloses a high speed, net weigh filler in which a constant rate feeder supplies bulk material to mechanism for dividing the material into equally sized and therefore uniformly heavy increments and then depositing the increments in containers.

The feeder includes a constant speed endless belt conveyor so mounted that it will move in a vertical direction if the weight of the material thereon changes. An adjustable counterweight is provided so the conveyor can be calibrated to lie in a null or neutral position when the amount of material thereon is at the desired level.

Bulk material is supplied to the feed end of the conveyor by a vibrating feeder. This feeder is operated by a variable speed magnetic oscillator so that the rate of material supply can be varied.

A pneumatic sensor detects the changes in position which result when the amount of material on the endless conveyor either rises above or falls below the selected level. The sensor is incorporated in a control system which speeds up or slows down the supply of material from the vibrating conveyor to compensate for the unwanted change in the amount of material carried by the endless conveyor.

A dashpot dampens the vertical movements of the conveyor and thereby inhibits the generation of signals which do not reflect actual changes in the amount of material carried by the conveyor.

Another constant rate feeder of the character just described is disclosed in U.S. Pat. No. 3,162,325 issued Dec. 22, 1964, to D. L. Hall et al.[1] This feeder differs in that a linear differential transformer is utilized to detect vertical movements of the constant speed conveyor rather than a pneumatic sensor and in that the control system is of a completely electrical character. The Hall et al control system has a faster response time than is normally possessed by a control system of the pneumatic type.

[1]. Still other constant rate feeders are disclosed in U.S. Pat. Nos. 2,206,237 issued July 2, 1940, to E. Roberts; 2,618,406 issued Nov. 18, 1952, to G. Kast; 2,753,099 issued July 3, 1956, to V. G. Jenmer et al; 2,889,030 issued June 2, 1959, to A. L. Mottet; 2,917,207 issued Dec. 15, 1959, to D. W. Prowse et al; 2,920,794 issued Jan. 12, 1960, to U. Bauder et al; 2,990,937 issued July 4, 1961, to T. P. Goslin; and 3,512,596 issued May 19, 1970, to W. Haack and in Swiss Pat. No. 324,457 to H. K. Muller dated Nov. 15, 1957.

I have now invented a novel, improved constant rate feeder which differs from that disclosed in my earlier patent in that an electrical control system, preferably with a differential transformer sensor, is employed and, even more importantly, in that there is used in conjunction with such control system, magnetic rather than dashpot damping of the vertical conveyor movements.[2] Magnetic damping permits the control system to be simplified. The novel magnetic damping arrangement I have invented also responds faster and more accurately than the dashpots heretofore employed, thereby making a significant contribution to the overall performance of the constant rate feeder.

[2]. Magnetic damping is not unknown in the weighing field (see, for example, U.S. Pat. Nos. 1,717,462 issued June 18, 1929, to H. Nogaoka et al and 2,666,635 issued Jan. 19, 1954, to R. B. Holt and PRODUCT ENGINEERING, May 1971, p. 49). Prior applications, however, involve modus operandi of a quite different character than that here involved as well as quite different structural arrangements.

The improved performance is particularly noticeable in comparison to arrangements such as those disclosed in Hall et al in which the material bearing leg of the conveyor passes over a scale platform. In such systems a sensor responsive to vertical movements of the scale platform provides the control system input signal.

There is, in this arrangement, the problem of damping the scale platform movement. There is also a significant lag between the time the material is deposited on the constant speed conveyor and the time it is weighed. In my novel feeder, in contrast, changes from the norm are instantly and accurately corrected.

From the foregoing it will be evident to the reader that one important and primary object of the invention resides in the provision of novel, improved constant rate feeders for bulk materials.

A related and also important object of the invention is the provision of machines in accord with the preceding object which have highly accurate feed rates and yet are free of undue complexity.

Other important objects and features and additional advantages of my invention will become apparent from the appended claims and as the ensuing detailed description and discussion proceeds in conjunction with the accompanying drawing, in which:

Figure 1:
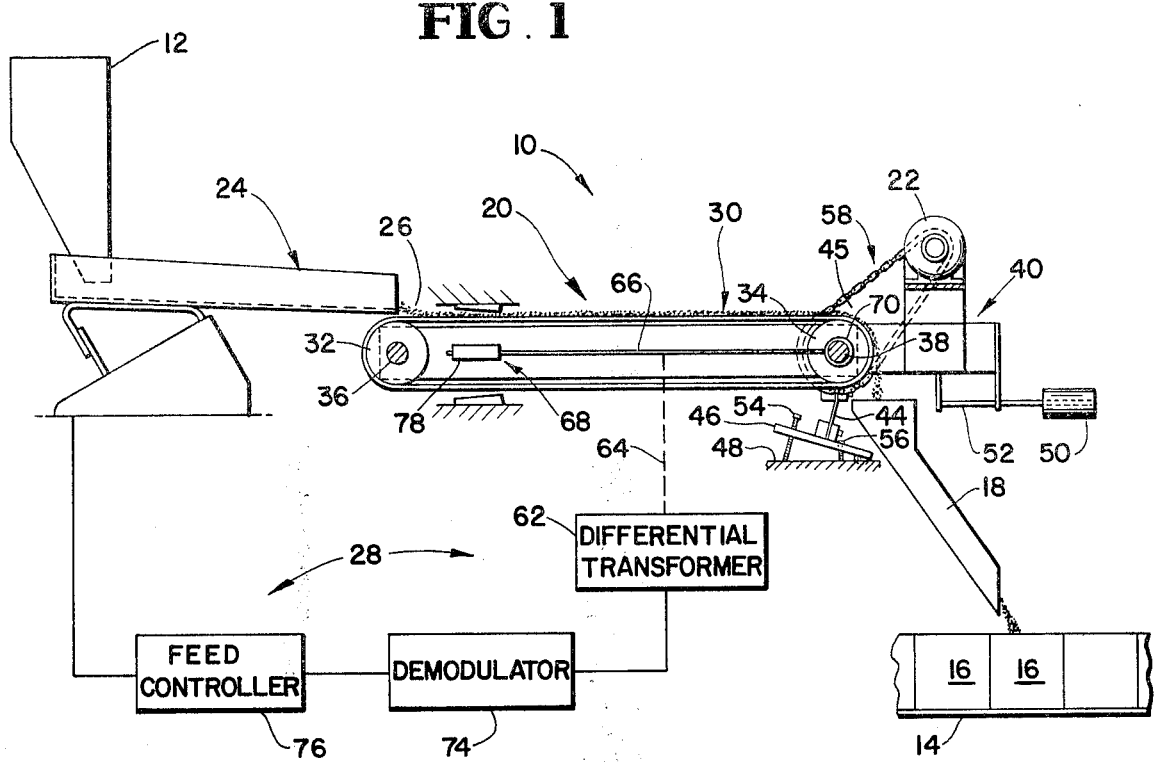
FIG. 1 is a side view of a constant rate feeder which is constructed in accord with the principles of the present invention.

Referring now to the drawing, FIG. 1 depicts a constant rate, bulk material feeder 10 which is constructed in accord with the principles of the present invention. In the illustrated application of that machine feeder 10 transfers bulk material from a hopper 12 to a container filling machine including a rotating platform 14 on which containers 16 are positioned. Platform 14 is rotated at a constant speed so that each of the containers 16 is filled for an equal length of time. Because feeder 10 delivers material through chute 18 to the containers at a constant rate, an equal amount of material is deposited in each container.

The major components of the constant rate feeder are an endless belt conveyor 20 driven at a constant speed by a synchronous motor 22, a vibrating conveyor 24 for transferring bulk material from hopper 12 to the feed end 26 of conveyor 20, and a control system 28. This system so regulates the operation of conveyor 24 as to increase the rate of supply to conveyor 20 if the amount of material on the latter decreases below a selected level and, conversely, to decrease the rate of supply if the amount of material on the conveyor increases above that level.

Conveyor 20 includes an endless belt 30 trained over rolls 32 and 34 at opposite ends of the conveyor. These rolls are mounted on transversely extending shafts 36 and 38 rotatably supported in the side members of conveyor frame 40.

The conveyor frame and components mounted thereon are supported by leaf springs 44 (only one of which is shown) extending between the conveyor frame 40 and a hinge or pivot plate 46. The latter is pivotally attached to a diagrammatically illustrated supporting structure 48 fixed relative to the conveyor.

The resilience in the leaf springs allows conveyor 20 to move in a vertically and generally arcuate path as the amount of material thereon changes. As the conveyor is cantilever supported at its discharge end 45, only a small variation in the amount of material deposited on the opposite, feed end will generate a large enough moment to produce vertical movement of sufficient magnitude for error correction.

Pivot plate 46 and a counterweight 50 threaded on conveyor frame supported shaft 52 permit the dead weight of the conveyor and the live weight of the material thereon to be balanced so the conveyor will lie in a particular null or neutral position when the selected amount of material is present on conveyor belt 30. Counterweight 50 is adjusted by threading it along shaft 52 and hinge plate 46 by rotating screws 54 (only one of which is shown). These screws are threaded through the hinge plate and engage support 48. The hinge plate is locked in the position to which it is thus adjusted by screws 56 extending through the plate into threaded engagement with the supporting structure.

The counterweight and conveyor mounting arrangements just described are illustrated and discussed in more detail in my earlier U.S. Pat. No. 3,087,652. This patent is hereby incorporated by reference and may be referred to by the reader if deemed necessary.[3]

[3]. It is not essential that the particular conveyor supporting arrangement described above be used. For example, the conveyor could instead be cantilever supported on air bearings.

The synchronous motor or other prime mover employed to drive conveyor belt 30 is mounted on conveyor frame 40. This keeps the motor output torque from causing unwanted vertical movement of the conveyor.

Motor 22 is drive-connected to belt driving conveyor roll 34 by a chain drive of the character identified by reference character 58 or by a comparable arrangement.

As in the constant rate feeder disclosed in my earlier patent, vertical displacements of the conveyor from the neutral position are indicative of changes in the amount of material present on the conveyor from the desired norm.

Figure 2:
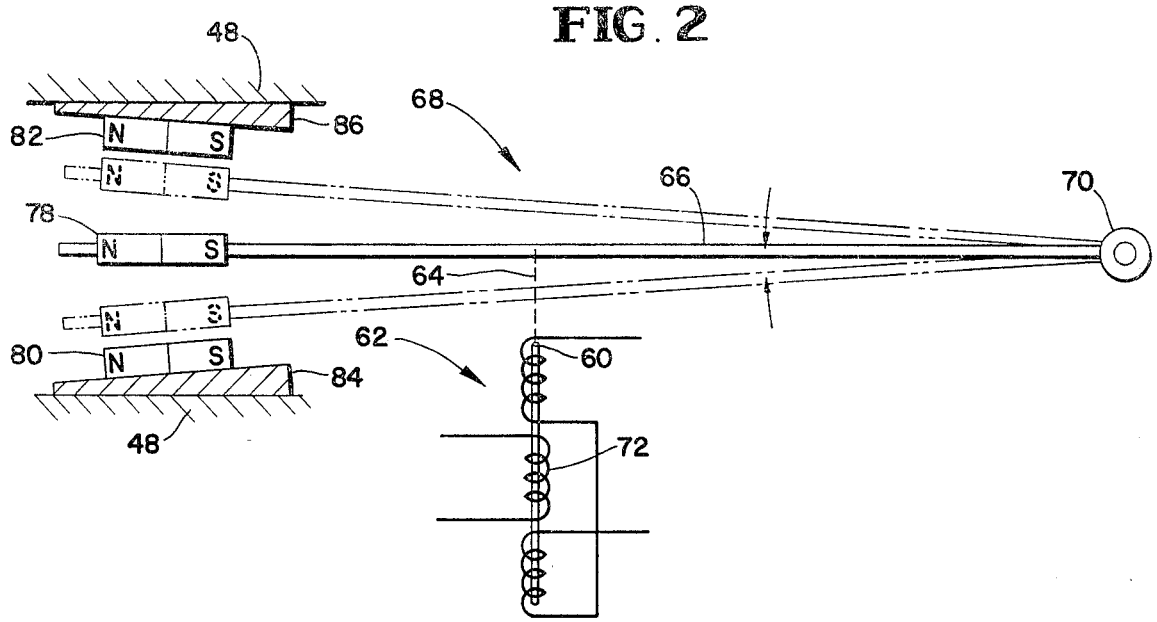
FIG. 2 is a side view, to an enlarged scale, of a magnetic damping unit employed in the constant rate feeder of FIG. 1.

In feeder 10, the armature 60 of a linear differential transformer 62 is coupled to conveyor frame 40 for movement therewith by a mechanical link 64 (see FIG. 2). In particular, link 64 is fixed to the beam 66 of a novel magnetic damping system 68 which will be described in detail presently. Beam 66 is, in turn, fixed to the side frames of the conveyor through a sleeve 70 surrounding the shaft 38 on which roll 34 is mounted. Thus, the vertical movements of beam 66 and armature 60 follow the same pattern as the conveyor.

The differential transformer is adjusted so that no current will flow through its secondary 72 when conveyor 20 is in its neutral position. However, if the weight of material on the conveyor changes, causing the latter to deviate from its neutral position, the resulting vertical displacement of armature 60 will cause a negative or positive voltage to appear across secondary 72.

This output signal is demodulated in a conventional demodulator 74 and amplified and the resulting signal is applied to a conventional controller 76. Depending upon the matnitude and polarity of the signal, controller 76 will either increase or decrease the rate of operation of vibrating conveyor 24 until the amount of material on conveyor 20 is returned to the desired level. It will then restore the supply rate to the nominal level required to have the desired amount of material present.

Control systems of the type just described are compact and uncomplicated. They can also be made to provide a high degree of accuracy as there are commercially available differential transformers which can be so adjusted that their entire range of voltage output can be obtained by only a 0.001–0.002 inch movement of the transformer armature.

Also, as the entire control system is electrical, responses are substantially instantaneous, eliminating the lag associated with pneumatic and comparable systems.

Feeder control systems of the character just discussed are described in more detail in U.S. Pat. No. 3,162,325, hereby incorporated herein. For this reason and because the details of the control system are not critical in the practice of the present invention, the system will not be described further herein.

The final, and a salient, feature of the present invention is the novel magnetic damping system 68. A damping system is necessary as the momentum of conveyor 20 would otherwise cause it to move distances greater than those indicative of actual changes in the amount of material on the conveyor 20. Failure to provide adequate damping could, therefore, introduce gross inaccuracies into the operation of the feeder.

In the typical "prior art" system a dashpot is employed for this purpose. Dashpots have the disadvantage that they introduce appreciable time lags into the operation of the system, negating the advantages that can be obtained by using electrical control systems and other features tending toward reductions in response time.

Delays of this character are eliminated by damping system 68. This system includes, in addition to the beam 66 referred to above, a movable magnet 78 attached to the free end of the beam and fixed magnets 80 and 82 adjustably attached by wedge-shaped mounts 84 and 86 to supporting structure 48.

Figure 3:
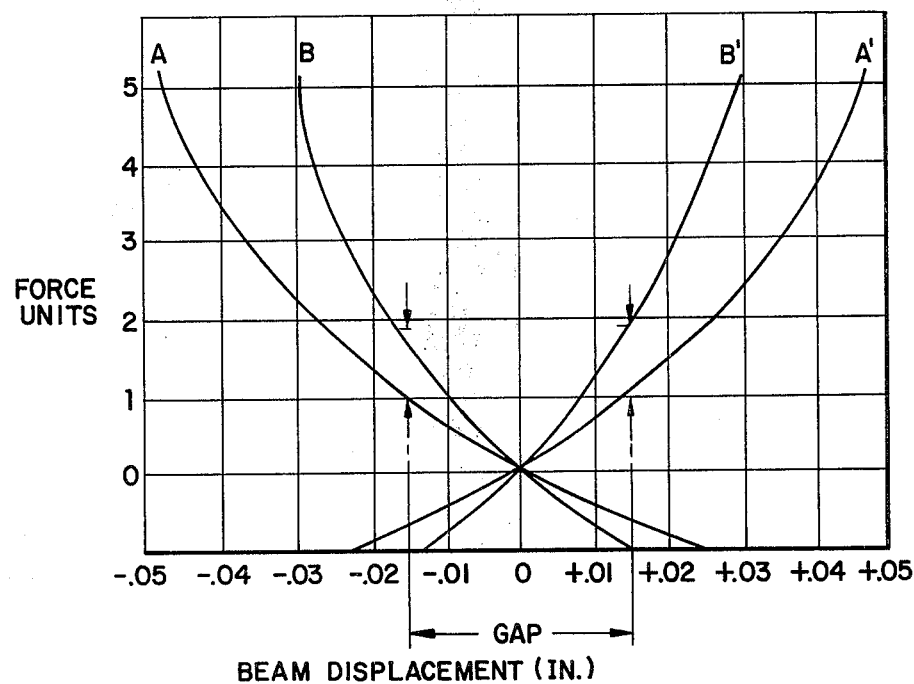
FIG. 3 shows graphically the operation of the damping unit.

The fixed magnets and movable magnet 78 are arranged with like poles facing. This results in repelling forces which increase in proportion to the magnitude of the conveyor movement and act in a direction which tends to not only arrest the momentum of the conveyor but also to displace it toward the desired neutral or null position (shown in full lines in FIG. 2). Because the repelling force increases in magnitude as the movable magnet 78 approaches one of the two fixed magnets (see FIG. 3), overshooting and hunting are effectively inhibited.

The effectiveness of the novel damping system just described is attributable in part to its use in combination with an electrical control system. Because a differential transformer is sensitive to very small displacements of the conveyor and because of the rapid control system response time, only small conveyor displacements will occur before corrections are made. Therefore, the conveyor will build up very little momentum and can be easily and rapidly arrested and returned toward its neutral position by the illustrated damping unit. At the same time those movements of smaller magnitude which are indicative of deviations from the norm are not affected in a manner which cannot be compensated for in the design or calibration of control system 28.

Figure 4:
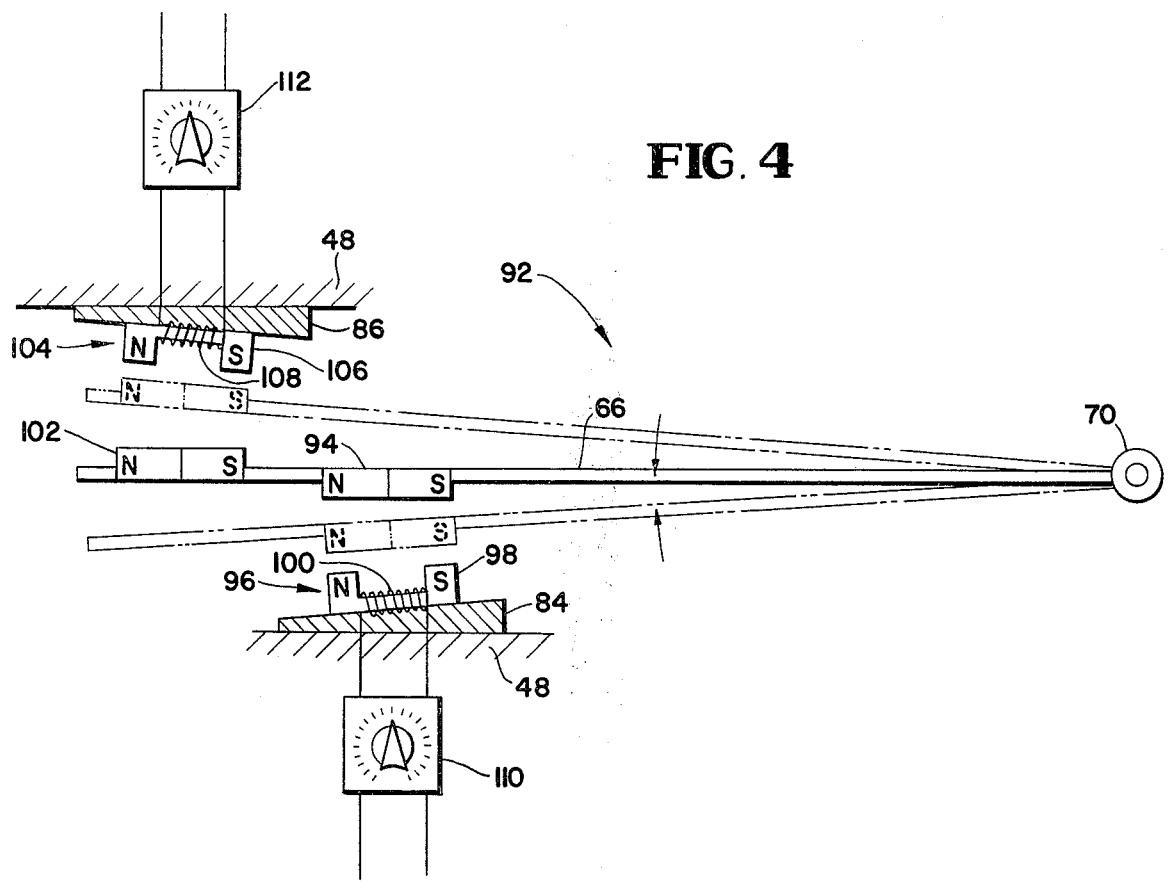
FIG. 4 is a view similar to FIG. 2 of an alternate form of magnetic damping unit.

Referring again to the drawing, FIG. 4 depicts a magnetic damping system 92 which is similar to that just described but differs in that the fixed magnets are electromagnets and in that the magnet pair employed to arrest downward motion of the conveyor is located nearer the pivot axis of the damping unit beam than the magnet pair employed to arrest movement in the opposite direction. The two magnetic damping systems are otherwise similar and like reference characters will accordingly be employed to designate like components thereof.

In magnetic damping system 92, movements in the downward direction are arrested by a magnet pair consisting of a movable magnet 94 mounted on beam 66 and a fixed electromagnet 96 consisting of a core 98 mounted on support 84 and a winding 100.

The arrangmment employed to arrest movement in the upward direction is similar. It includes a movable magnet 102 mounted on beam 66 and a fixed electromagnet 104 having a core 106 attached to support 86 and a winding 108.

Magnet pair 102, 104 is located further from the pivot axis of the beam than magnet pair 94, 96. This arrangement can be used to physically accommodate other components of the constant rate feeder and/or to accurately limit the movements of beam 66 and conveyor 20 to those indicative of actual deviations in the amount of material on conveyor 20 from that which is desired.

Potentiometers 110 and 112 are connected in series with the windings 100 and 108 of electromagnets 96 and 104. These permit the forces exerted by the magnets to be adjusted for particular applications of the invention without the necessity of altering the air gaps between the magnets.

Many changes may of course be made in those physical exemplifications of the invention discussed above without exceeding its scope. For example, a sensing system of the type disclosed in U.S. Pat. No. 3,680,650 issued Aug. 1, 1972, to Zimmerer can be substituted for the differential transformer in control system 28; and the material handling equipment to which the bulk material is transferred from the constant rate feeder can be of widely divergent character.

It will also be apparent from the foregoing that the invention may be embodied in still other forms without departing from the spirit or essential characteristics thereof. The disclosed embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A constant rate feeder for bulk materials which comprises the combination of: a constant speed conveyor having a discharge end and a feed end; means for supplying material to the feed end of the conveyor; means for detecting vertical motions of said conveyor resulting from changes in the amount of the material thereon; control means having as an input a signal generated by said motion detecting means for so regulating the operation of said material supplying means as to decrease the rate of supply of material to the conveyor as the amount of the material thereof increases and vice versa; and magnetic damping means capable of exerting a restoring force which increases in proportion to the magnitude of vertical movement of the conveyor for magnetically damping the vertical motions of said conveyor.

2. A constant rate feeder for bulk materials which comprises the combination of: a constant speed conveyor having a discharge end and a feed end; means for supplying material to the feed end of the conveyor; means supporting said conveyor at a location spaced from the feed end of the conveyor toward the discharge end thereof; means for detecting movements of said conveyor resulting from changes in the weight of the material thereon; control means having as an input a signal generated by said movement detecting means for so regulating the operation of said material supplying means as to decrease the rate of supply of material to the conveyor as the weight of the material thereof increases and vice versa; and magnetic damping means capable of exerting a restoring force which increases in proportion to the magnitude of movement of the conveyor relative to a neutral position for magnetically damping the movement of said conveyor.

3. A constant rate feeder for bulk materials which comprises the combination of: a constant speed conveyor having a discharge end and a feed end; means for supplying material to the feed end of the conveyor; means at a location spaced from the feed end of the conveyor toward the discharge end thereof mounting said conveyor for vertical movement; means for detecting vertical movements of said conveyor resulting from changes in the weight of the material thereon; control means having as an input a signal generated by said movement detecting means for so regulating the operation of said material supplying means as to decrease the rate of supply of material to the conveyor as the weight of the material thereon increases and vice versa; and means for magentically damping the movement of said conveyor which comprises a magnet movable with said conveyor and fixed magnets on opposite sides of said movable magnet whereby, as said conveyor moves from the neutral position it assumes when the wanted weight of material is being carried thereby, said movable magnet will approach one of the fixed magnets, thereby generating a force of repulsion proprotional to the magnitude of movement of the movable magnet relative to a neutral position which will tend to restore said conveyor to said neutral position.

4. The constant rate feeder of claim 3, wherein the fixed magnets are permanent magnets.

5. The constant rate feeder of claim 3, wherein the fixed magnets are electromagnets.

6. The constant rate feeder of claim 3, wherein said movement detecting means is a differential transformer having its armature mechanically linked to said conveyor for movement therewith.

7. A constant rate feeder for bulk materials which comprises the combination of: a constant speed conveyor having a discharge end and a feed end; means for supplying material to the feed end of the conveyor; means at a location spaced from the feed end of the conveyor toward the discharge end thereof mounting said conveyor for vertical movement; means for detecting vertical movements of said conveyor resulting from changes in the weight of the material thereon; control means having as an input a signal generated by said movement detecting means for so regulating the operation of said material supplying means as to decrease the rate of supply of material to the conveyor as the weight of the material thereon increases and vice Versa; and means for magnetically damping the movement of said conveyor which comprises a beam movable with said conveyor, a movable magnet fixed to said beam for movement therewith, and a magnet fixed against movement relative to said beam and said conveyor, said magnets having juxtaposed like poles whereby, as said conveyor moves from the neutral position it assumes when the wanted weight of material is being carried thereby toward the fixed magnet, said movable magnet will approach said fixed magnet, thereby generating a force of repulsion proportional to the magnitude of the movable magnet relative to a neutral position which will tend to restore said conveyor to said neutral position.

8. The constant rate feeder of claim 7, wherein the means for magnetically damping the movement of the conveyor also includes a second movable magnet fixed to said beam for movement therewith, a second magnet fixed against movement relative to said beam and said conveyor, said second fixed magnet being located on the opposite side of said beam from the first-mentioned fixed magnet and having its poles juxtaposed to the like poles of the second movable magnet whereby, as said conveyor moves from the neutral position it assumes when the wanted weight of material is being carried thereby toward either of said fixed magnets, the associated movable magnet will approach the fixed magnet, thereby generating a force of repulsion which will tend to restore said conveyor to its neutral position.

9. The constant rate feeder of claim 8, wherein the magnet pairs consisting of a fixed magnet and a movable magnet are spaced along said beam relative to each other.

10. A constant rate feeder for bulk materials which comprises the combination of: a constant speed conveyor having a discharge end and a feed end; means for supplying material to the feed end of the conveyor; means at a location spaced from the feed end of the conveyor toward the discharge end thereof mounting said conveyor for vertical movement; means for detecting vertical movements of said conveyor resulting from changes in the weight of the material thereon; control means having as an input a signal generated by said movement detecting means for so regulating the operation of said material supplying means as to decrease the rate of supply of material to the conveyor as the weight of the material thereon increases and vice versa; and means for magnetically damping the movement of said conveyor which comprises a magnet movable with said conveyor and fixed electromagnets on opposite sides of said movable magnet whereby, as said conveyor moves from the neutral position it assumes when the wanted weight of material is being carried thereby, said movable magnet will approach one of the fixed magnets, thereby generating a force of repulsion which will tend to restore said conveyor to said neutral position; and means for adjusting the flux density in said electromagnets, whereby the forces exerted by the magnets can be changed without altering the air gaps between the magnets.

* * * * *